June 8, 1965
G. KIPER
3,187,655
RETARDING DEVICE FOR PHOTOGRAPHIC SHUTTER
Filed Jan. 24, 1963
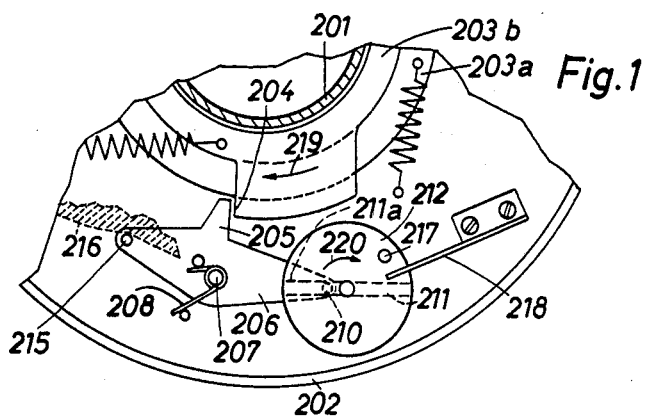
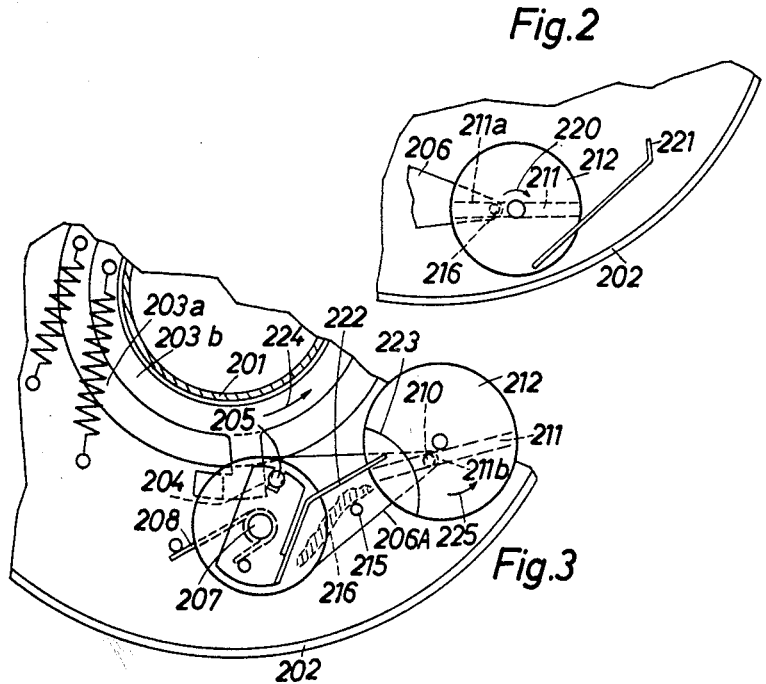
INVENTOR.
GERD KIPER
BY Connolly and Hutz
attorneys ३,१८७,६५५
RETARDING DEVICE FOR PHOTOGRAPHIC SHUTTER
Gerd Kiper, Unterhaching, near Munich, Germany, assignor to Agfa Aktiengesellschaft, Leverkusen, Germany, a corporation of Germany
Filed Jan. 24, 1963, Ser. No. 253,669
Claims priority, application Germany, Apr. 14, 1960, A 39,397
9 Claims. (Cl. 95—63)

This invention relates to a device for retarding the release of a photographic shutter by applying the inertia of a retarding mass to it through a retarding lever, and it more particularly relates to such a device in which the transmission between the retarding device and shutter incorporates a pair of closed contour-coupled elements.

Retarding devices of the aforementioned kinds are described in copending, commonly-assigned application for U.S. Letters Patent S.N. 99,583, filed March 30, 1961, by this same inventor, now Patent No. 3,092,003, and this application is a continuation-in-part of that earlier filed application. Application S.N. 99,583 describes a retarding device for a photographic shutter incorporating a retarding lever in the transmission between a retarding mass and the shutter. The force-transmitting ratio of the transmission decreases relative to its application of the force of the retarding mass during the operation of the retarding device, and it is also controlled to provide lower ratios for faster shutter speeds and greater ratios for slower shutter speeds. That retarding arrangement provides the advantage of applying strong positive retardation to the shutter, and it permits an economical, accurate, linearly arranged shutter time adjusting control to be used for setting geometrically varying shutter speeds.

The aforementioned kind of retarding device may utilize either a power or closed contour-coupled connection between the retarding lever and the retarding mass. In the power-coupled type of connection a return spring upon the retarding mass assures that it maintains contact with the retarding lever. That arrangement has the disadvantage of having the force of this return spring working against the shutter driving mechanism at a high transmission ratio when a maximum retarding effect is being applied. This reduces the certainty that the shutter will satisfactorily complete its operation at slower speeds.

In the closed contour-coupled type of retarding device the retarding lever and mass are for example connected to each other through a pin and slot connection. That arrangement has the disadvantage when providing slight amounts of retardation at low transmission ratios that any clearance or play in the pin and slot connection will seriously affect the operation of the retarding device. This is particularly true when the pin and slot are in an extreme position out of driving contact with each other at the beginning of the retarding action to provide a great deal of play which must be absorbed before any retarding action is applied thereby introducing serious errors in shutter timing.

In accordance with this invention a spring is utilized to eliminate play between closed contour-coupled parts in a shutter retarding device throughout part of their path of coupled movement. It is particularly advantageous to so utilize a spring only in the phase of operation where the transmission ratios between the retarding lever and mass are relatively low. In one form of this invention a spring is secured to a stationary portion of the camera, and a projection upon one of the coupled retarding elements contacts the spring during low transmission ratio phases of operation thereby maintaining the closed contour-coupled retarding elements in contact with each other in the active direction of movement. In accordance with another form of this invention a spring mounted upon one of the retarding elements is arranged to contact a wall of the housing during low transmission ratio phases of operation thereby maintaining the retarding elements in contact with each other in reaction to the applied tension. It is also possible to mount a spring upon one of the retarding elements in position to contact a surface upon the other element during the low transmission ratio phase of operation to maintain them in driving contact with each other during that phase. The retarding elements can for example be closed contour-coupled together by a pin and slot connection.

This invention can accordingly inactivate the spring throughout high transmission ratio phases of operation during which it might impair the certainty of completion of the shutter operation, whereas positive contact within the closed contour-coupling is maintained during low transmission ratio phases of operation in which the retarding spring forces are correspondingly slight and only interpose correspondingly slight opposition to a shutter operation. This prevents deviations from optimum retarding forces and accurate shutter times and permits very fast shutter speeds to be achieved. It is thus possible to extend the operating range of a retarding device from three and one-half light stops without this invention corresponding to exposure times of for example from 3.2 to 40 milliseconds to approximately four and one-half light stops corresponding to a range of exposure times from 1.6 to 40 milliseconds.

Novel features and advantages of the present invention will become apparent to one skilled in the art from a reading of the following description in conjunction with the accompanying drawings wherein similar reference characters refer to similar parts and in which:

FIG. 1 is a partial view in elevation of a retarding device which is one embodiment of this invention;

FIG. 2 is a similar view of another embodiment of this invention; and

FIG. 3 is a similar view of still another embodiment of this invention.

In FIG. 1 two shutter sector rings 203a and 203b are rotatably mounted about lens tube 201 of shutter housing 202 and thereby concentrically about the optical axis of the camera incorporating housing 202. Shutter sector ring 203b includes a surface 204 which is movably contacted by retarding projection 205 upon retarding lever 206. Retarding lever 206 includes a pair of arms, and it is rotatably mounted upon a substantially centrally disposed pin 207 secured to a stationary portion of housing 202. Spring 208, which is for example a torsion spring, reacts between a pair of pins on lever 206 and housing 202 in a direction to urge lever 206 in a clockwise direction of rotation. One end of retarding lever 206 is closed contour-coupled with rotatably retarding mass or disc 212 by engagement of a pin 210 on lever 205 within a slot 211 in disc 212. Slot 211 is for example radially arranged upon disc 212, but slot 211 could also be arranged in various positions and also be variously curved. The initial position of retarding lever 206 and the retarding effect of the device are adjusted by the engagement of pin 215 on lever 206 with time adjusting cam 216. During slower shutter speeds and longer exposure times, any play between closed contour-coupled pin 210 and slot 211 upon retarding elements 206 and 212 is relatively insignificant because the transmission ratio between these parts is relatively high with respect to transmitting the force of the retarding mass to the shutter. In addition, the use of a spring (later described) to eliminate such clearance or play would apply too great a retarding force to the shutter thereby interfering with its operation. However during faster shutter speeds and shorter exposure times, the transmission ratio existing between retarding elements 206 and 212 with respect to transmitting the retarding effect is relatively low. In addition any clearance or play between closed contour-coupled parts 212 and 211 during short exposure times and fast shutter speeds where maximum accuracy is highly important would cause relatively great errors in the resultant short exposure times. The embodiment shown in FIG. 1 accordingly avoids this disadvantage by mounting a pin 217 on disc 212 for contacting spring 218 mounted on housing 202 during the low transmission ratio phase of operation between retarding elements 206 and 212. Spring 218 presses slot wall 211a lightly against pin 210 to eliminate any play between slot 211 and pin 210 as sector ring 203 rotates in the direction of arrow 219 and causes disc 212 through the reaction of lever 206 to rotate in the direction of arrow 220. This clearance or play-eliminating action occurs when time adjusting cam 216 is adjusted to provide short retarding periods during which retarding lever 206 is rotated counter-clockwise with respect to the disposition illustrated in FIG. 1. During such periods disc 212 is rotated in the direction of arrow 220 to bring its pin 217 into contact with spring 218. Spring 218 then presses wall 211a of slot 211 against pin 210 to maintain retarding lever 206 and disc 212 in movable engagement through closed contour-coupled pin 210 and slot 211 from the very first movement of retarding lever 206.

The arrangement of FIG. 2 provides a similar action. However in FIG. 2 spring 221 is mounted upon disc 212, and it engages housing 202 during low transmission ratio phases of engagement of retarding elements 206 and 212 that occur during short retarding periods. When spring 221 engages housing 202, it is slightly tensioned, and its reaction presses wall 211a of slot 211 against pin 210.

FIG. 3 shows another form of this invention in which spring 222 is mounted upon one of retarding elements 206 and 212, for example upon retarding lever 206A, to maintain it engaged in contact with surface 223 when set for short retarding periods and low transmission ratios. When sector ring 203b and disc 212 are respectively rotated in the direction of arrows 224 and 225 slot wall 211b is pressed into contact with pin 210 by the reaction between spring 222 and surface 223, and any play between closed contour-coupled retarding elements 210 and 211 is eliminated.

This invention can be used in retarding devices different from those illustrated. For example, it can also be used when the transmission ratio between the retarding elements does not decrease during operation, and it can therefore be used in other types of arresting device in which the transmission ratio first increases and then decreases or varies in some other manner.

What is claimed is:

1. A retarding device for a photographic shutter having operating means for opening and closing it and a moving element connected to it characterized in that the exposure time provided by said shutter is a function of the speed of movement of said moving element, said retarding device comprising a retarding lever including driven and retarded ends, pivot means rotatably mounting said retarding lever with its driven end interposed in the path of said moving element for engaging said moving element to retard it and said shutter, a retarding mass, bearing means rotatably mounting said retarding mass in the path of said retarded end of said retarding lever, closed contour means coupling said retarding lever and mass together to cause the retarding effect of said mass to be transmitted through said lever to said shutter during its operation, resilient means, and mounting means causing said resilient means to react between said lever and said mass during the low transmission ratio phase of operation of said retarding device and to be free from reacting between said lever and said mass at higher transmission ratios to maintain said closed contour means in engaged contact during said low transmission ratio phase of operation whereby any play in it is eliminated.

2. A retarding device for a photographic shutter having operating means for opening and closing it and a moving element connected to it characterized in that the exposure time provided by said shutter is a function of the speed of movement of said moving element, said retarding device comprising a retarding lever including driven and retarded ends, pivot means rotatably mounting said retarding lever with its driven end interposed in the path of said moving element for engaging said moving element to retard it and said shutter, a retarding mass, bearing means rotatably mounting said retarding mass in the path of said retarded end of said retarding lever, closed contour means coupling said retarding lever and mass together to cause the retarding effect of said mass to be transmitted through said lever to said shutter during its operation, resilient means reacting between said lever and said mass during a portion of the phase of operation of said retarding device to maintain said closed contour means in engaged contact whereby any play in it is eliminated, said closed contour means being arranged to have contacting portions which engage each other at moment arms relative to the axes of rotation of said retarding lever and mass which vary during their contacting movement to cause the retarding force transmitted through said lever to vary during the operation of said shutter, and control means being engaged with said retarding lever for varying the amount of initial interposition of said driven end of said retarding lever into the path of said moving element and the initial moment arm of said contacting portions relative to the axis of rotation of said retarding mass at the beginning of said contacting movement to vary its retarding effect upon said shutter whereby slower shutter speeds are provided with greater amounts of said interposition and smaller initial moment arms.

3. A retarding device as for a photographic shutter having operating means for opening and closing it and a moving element connected to it characterized in that the exposure time provided by said shutter is a function of the speed of movement of said moving element, said retarding device comprising a retarding lever including driven and retarded ends, pivot means rotatably mounting said retarding lever with its driven end interposed in the path of said moving element for engaging said moving element to retard it and said shutter, a retarding mass, bearing means rotatably mounting said retarding mass in the path of said retarded end of said retarding lever, closed contour means coupling said retarding lever and mass together to cause the retarding effect of said mass to be transmitted through said lever to said shutter during its operation, resilient means reacting between said lever and said mass during a portion of the phase of operation of said retarding device to maintain said closed contour means in engaged contact whereby any play in it is eliminated, a control means being engaged with said retarding lever for varying its initial position relative to said retarding mass to vary the transmission ratio provided by said lever transmitting the force of said retarding mass to said shutter from greater to lesser ratios with respect to said retarding mass, said resilient means being constructed and arranged for maintaining said closed contour means in engaged contact only during a portion of said phase of operation when said lever is adjusted to provide a relatively low transmission ratio in transmitting the force of said retarding mass to said shutter, said retarding lever and said mass comprising closed contour-coupled elements, said spring being mounted upon one of said elements, a stationary abutment upon said shutter disposed in the path of movement of said spring, and said spring contacting said abutment during the low transmission phase of operation of said device.

4. A retarding device for a photographic shutter having operating means for opening and closing it and a moving element connected to it characterized in that the exposure time provided by said shutter is a function of the speed of movement of said moving element, said retarding device comprising a retarding lever including driven and retarded ends, pivot means rotatably mounting said retarding lever with its driven end interposed in the path of said moving element for engaging said moving element to retard it and said shutter, a retarding mass, bearing means rotatably mounting said retarding mass in the path of said retarded end of said retarding lever, closed contour means coupling said retarding lever and mass together to cause the retarding effect of said mass to be transmitted through said lever to said shutter during its operation, resilient means reacting between said lever and said mass during a portion of the phase of operation of said retarding device to maintain said closed contour means in engaged contact whereby any play in it is eliminated, said shutter being mounted within a housing, said resilient means comprising a spring, and said spring being mounted upon said housing in the path of movement of said retarding mass for reacting against said retarding mass during a portion of its path of movement.

5. A retarding device as set forth in claim 4 wherein a pin is mounted upon said retarding mass, and said pin being arranged for contacting said spring only during the low transmission ratio phase of operation of said retarding device.

6. A retarding device for a photographic shutter having operating means for opening and closing it and a moving element connected to it characterized in that the exposure time provided by said shutter is a function of the speed of movement of said moving element, said retarding device comprising a retarding lever including driven and retarded ends, pivot means rotatably mounting said retarding lever with its driven end interposed in the path of said moving element for engaging said moving element to retard it and said shutter, a retarding mass, bearing means rotatably mounting said retarding mass in the path of said retarded end of said retarding lever, closed contour means coupling said retarding lever and mass together to cause the retarding effect of said mass to be transmitted through said lever to said shutter during its operation, resilient means reacting between said lever and said mass during a portion of the phase of operation of said retarding device to maintain said closed contour means in engaged contact whereby any play in it is eliminated, said retarding lever and said mass comprising closed contour-coupled elements, a spring being mounted upon one of said elements, and a surface upon the other of said elements being engaged by said spring during the low transmission ratio phase of operation of said retarding device.

7. A retarding device as set forth in claim 1 wherein said closed contour means comprises a pin and slot connection.

8. A retarding device as set forth in claim 7 wherein said resilient means comprises a spring, said slot having walls, and said spring reacting between said elements to maintain said pin engaged with one wall of said slot during said low transmission phase of operation of said retarding device.

9. A retarding device for a photographic shutter comprising a retarding lever for retarding said shutter, a retarding mass mounted in the path of motion of said retarding lever, means coupling said retarding lever and mass together to cause the retarding effect of said mass to be transmitted through said lever to said shutter during its operation, resilient means, and mounting means causing said resilient means to react between said lever and said mass during the low transmission ratio phase of operation of said retarding device and to be free from reacting between said lever and said mass at higher transmission ratios to maintain said lever and mass in contact with each other during said low transmission phase of operation whereby any play between them is eliminated.

References Cited by the Examiner
UNITED STATES PATENTS
3,093,048    6/63    Starpe _____ 95—63

JOHN M. HORAN, *Examiner.*